(12) United States Patent
Schaefer

(10) Patent No.: US 9,135,415 B2
(45) Date of Patent: Sep. 15, 2015

(54) CONTROLLING ACCESS

(71) Applicant: NOKIA SIEMENS NETWORKS OY, Espoo (FI)

(72) Inventor: Manfred Schaefer, Forstinning (DE)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 61 days.

(21) Appl. No.: 13/773,887

(22) Filed: Feb. 22, 2013

(65) Prior Publication Data

US 2013/0219473 A1     Aug. 22, 2013

(30) Foreign Application Priority Data

Feb. 22, 2012  (WO) ................. PCT/EP2012/052972

(51) Int. Cl.
  *H04L 29/06*     (2006.01)
  *G06F 21/31*    (2013.01)
  *G06F 21/33*    (2013.01)

(52) U.S. Cl.
  CPC .............. *G06F 21/31* (2013.01); *G06F 21/335* (2013.01); *H04L 63/10* (2013.01); *G06F 2221/2137* (2013.01); *H04L 63/083* (2013.01); *H04L 63/0807* (2013.01)

(58) Field of Classification Search
  None
  See application file for complete search history.

(56) References Cited

U.S. PATENT DOCUMENTS

| | | | |
|---|---|---|---|
| 6,335,927 B1 * | 1/2002 | Elliott et al. | 370/352 |
| 6,704,873 B1 * | 3/2004 | Underwood | 726/12 |
| 7,290,288 B2 * | 10/2007 | Gregg et al. | 726/28 |
| 7,437,757 B2 * | 10/2008 | Holdsworth | 726/9 |
| 8,102,814 B2 * | 1/2012 | Rahman et al. | 370/331 |
| 8,270,310 B2 * | 9/2012 | Raleigh | 370/252 |
| 8,327,141 B2 * | 12/2012 | Vysogorets et al. | 713/168 |
| 8,387,155 B2 * | 2/2013 | Gregg et al. | 726/29 |
| 8,505,084 B2 * | 8/2013 | Shukla et al. | 726/9 |
| 8,613,067 B2 * | 12/2013 | Lambiase et al. | 726/8 |
| 8,745,705 B2 * | 6/2014 | Hitchcock et al. | 726/5 |
| 8,776,194 B2 * | 7/2014 | Hitchcock et al. | 726/6 |
| 2006/0171537 A1 | 8/2006 | Enright | |
| 2009/0271847 A1 | 10/2009 | Karjala et al. | |
| 2010/0188975 A1 | 7/2010 | Raleigh | |
| 2010/0257578 A1 | 10/2010 | Shukla et al. | |
| 2011/0119747 A1 | 5/2011 | Lambiase | |

FOREIGN PATENT DOCUMENTS

| | | | |
|---|---|---|---|
| EP | 2384040 A1 | 11/2011 | |
| WO | WO 2010/063091 A2 | 6/2010 | |

OTHER PUBLICATIONS

Morin, Jean-Henry; Pawlak, Michel. A Model for Credential Based Exception Management in Digital Rights Management Systems. ICIMP 2007. Pub. Date: 2007. http://ieeexplore.ieee.org/stamp/stamp.jsp?tp=&arnumber=4271786.*

(Continued)

*Primary Examiner* — Dede Zecher
*Assistant Examiner* — Jeremiah Avery
(74) *Attorney, Agent, or Firm* — Squire Patton Boggs (US) LLP

(57) ABSTRACT

To provide access to an account in an apparatus in response to a request to the account, the apparatus creates and forwards a challenge for this request and waits for a token signed by a centralized signing entity for the account, the token comprising access enabling data. When such a token is received, the apparatus validates the token, and only if the validation succeeds, enables access to the account.

21 Claims, 5 Drawing Sheets

(56) References Cited

OTHER PUBLICATIONS

Hebig, Regina N; Meinel, Christoph; Menzel, Michael; Thomas, Ivonne; Warschofsky, Robert. A Web Service Architecture for Decentralised Identity- and Attribute-based Access Control. ICWS 2009. Pub. Date: 2009. Relevant pp. 551-558. http://ieeexplore.ieee.org/stamp/stamp.jsp?tp=&arnumber=5175868.*

Khansa, Lara; Liginlal, Divakaran. Access Granted: The Imperative of Innovation and Standardization in Information Security. 2007 IEEE International Engineering Managment Conference. Pub. Date: 2007. Relevant pp. 101-107. http://ieeexplore.ieee.org/stamp/stamp.jsp?tp=&arnumber=5235040.*

International Search Report and Written Opinion dated Jul. 4, 2012 corresponding to International Patent Application No. PCT/EP2012/052972.

D. Cooper et al., "Internet X.509 Public Key Infrastructure Certificate and Certificate Revocation List (CRL) Profile," Network Working Group, Internet Standard RFC 5280, May 2008, 131 pages.

Office Action dated Jul. 21, 2015, issued in corresponding KR patent application No. 10-2014-7026444 (English translation only).

* cited by examiner

CONTROLLING ACCESS

FIELD

The present invention relates to controlling access to an account in an apparatus.

BACKGROUND ART

The following description of background art may include insights, discoveries, understandings or disclosures, or associations together with dis-closures not known to the relevant art prior to the present invention but provided by the invention. Some such contributions of the invention may be specifically pointed out below, whereas other such contributions of the invention will be apparent from their context.

Computers, other computing apparatuses, computer systems and communication systems support at least two different types of accounts, a user account and an administrator account, and some of them support also a type called herein a maintenance service account. The user account allows use of different services provided by the system or the apparatus, like online services provided over Internet, and using different applications, like word processing or drawing applications, etc. The administrator account, also called a root administrator account, allows the use of the same services as the user account and possibly nearly unlimited rights to change system information, like configuration information of the system, amending user access rights provided by user accounts, loading of new applications, etc. The maintenance service accounts were created for situations in which apparatuses of one vendor are used in several different systems, and authorized maintenance persons of the vendor or the system owner needs to obtain rights to change at least maintenance related information of an apparatus but should obtain only specific rights to the system the apparatus belongs to. By means of a maintenance service account debugging functionality for the apparatus may be enabled, security functions and sensitive data of the apparatus may be configured, a recovery procedure for the apparatus may be initiated, an unlock function reactivating user accounts disabled due to an operation error of the apparatus may be initiated, for example. A maintenance service account may also be part of a specific application executed by the apparatus.

A general challenge relating to the maintenance service accounts is, especially when apparatuses of the vendor are installed in several systems, how to enable each person belonging to an authorized group for maintenance service to access maintenance service accounts of such apparatuses in any individual system and to minimize the risk that a person not belonging to the authorized group obtains access to a maintenance service account. For example, if default passwords are used and someone not belonging to the authorized group finds out them, he/she can obtain access to a service account of the authorized group. In other words, the challenge is how to handle that many users (persons) belonging to an authorized group, and only the users, are authenticated/authorized to have access to all apparatuses having a service account for the authorized group.

SUMMARY

An object of the present invention is to provide a secure access mechanism to handle the above challenge. The object of the invention is achieved by methods, an apparatus, a system and a computer program product which are characterized by what is stated in the independent claims. The preferred embodiments of the invention are disclosed in the dependent claims.

An aspect provides a solution in which an apparatus having an account creates, in response to a request to access the account, a challenge to obtain signed access enabling data for the account, receives signed data, validates the signed received data, and enables access to the account if the validation succeeds.

BRIEF DESCRIPTION OF THE DRAWINGS

In the following, embodiments will be described in greater detail with reference to accompanying drawings, in which.

DETAILED DESCRIPTION OF SOME EMBODIMENTS

The following embodiments are exemplary. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments.

The present invention is applicable to any system and apparatus that support a principle of digital signature service. The system may be a wireless system or a system utilizing both fixed connections and wireless connections or a fixed system. The system may be a communication system comprising one or more networks or a computer system or a server system. The specifications of different systems, especially when wireless communication is utilized, and requirements and used algorithms for the digital signature service, develop rapidly. Such development may require extra changes to an embodiment. Therefore, all words and expressions should be interpreted broadly and they are intended to illustrate, not to restrict, the embodiment.

In the following different examples are described using a public key infrastructure to provide the digital signature service. In the illustrated digital signature service the signing apparatus performs at least the following: calculates a hash from data to be signed, encrypts the hash using its private key for the signing service, adds the encrypted hash to the data, and sends the thus obtained signed token. The token preferably contains or is associated with some certificate information with which the receiving apparatus can find out the public key of the signing apparatus for this signing service, either attached to the signed token or attached to the data before the token was signed. Alternatively, pre-installed certificate information may be used. The receiving apparatus extracts the data and the encrypted hash from the token, calculates a hash from the data and decrypts the encrypted hash by using a public key of the signing apparatus, indicated by the means of the certificate information, for example, and compares the two hash values. If they are the same, the receiving apparatus validates the associated certificate(s) and the signature and verifies the token. Herein, a token is used in the meaning of digitally signed access enabling data without restricting the token to such contents. For example, a token that is an access token by its own may be used, for some automated maintenance, for example. Further, it should be appreciated that the invention is not restricted to the illustrated example of digital signature; other corresponding mechanisms may be used as well. For example, a crypto-mechanism based on RSA (Rivest-Shamir-Adelman algorithm) keys may be used, or other crypto-systems, like elliptic curve cryptography may be used.

Figure 1:
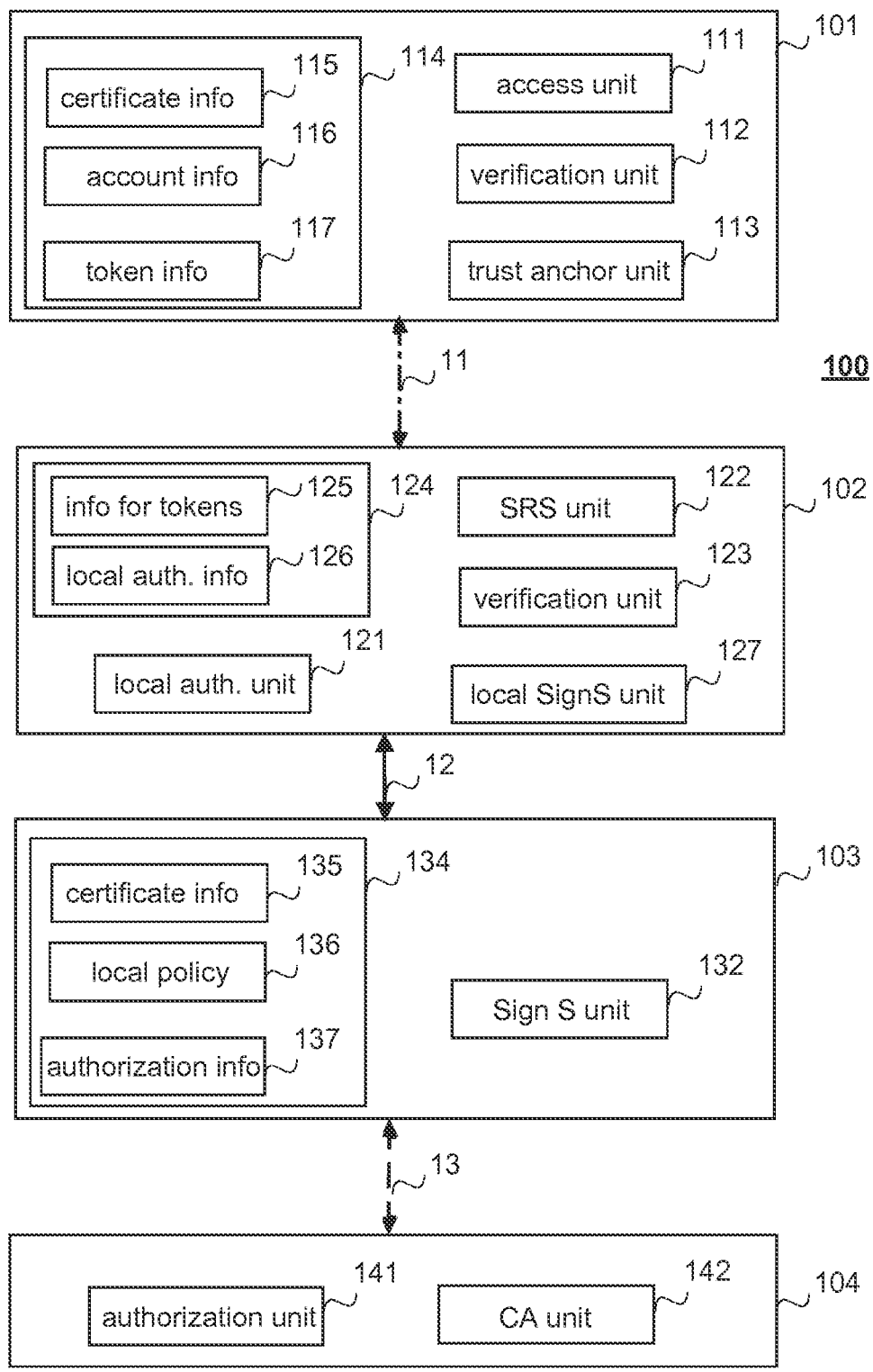
FIG. 1 shows simplified architecture of an exemplary system having schematic block diagrams of exemplary apparatuses.

A general architecture of an exemplary system 100 supporting maintenance service accounts and a digital signature service is illustrated in FIG. 1. FIG. 1 is a simplified system architecture only showing some elements and functional entities, all being logical units whose implementation may differ from what is shown. The connections shown in FIG. 1 are logical connections; the actual physical connections may be different. It is apparent to a person skilled in the art that the systems also comprise other functions and structures that are not illustrated. Further, it should be appreciated that the actual services provided by a maintenance service account and the use of such services, structures, elements and the protocols used in or for information exchange, are irrelevant to the actual invention. Therefore, they need not to be discussed in more detail here. Further, a reference to the description in the background art relating to the maintenance service accounts is made.

The illustrated parts of the system 100 in FIG. 1 are an apparatus 101 having a maintenance service account, a trusted apparatus 102, an apparatus 103 for a centralized signing service and apparatus 104 for a certificate authority entity 104. In the illustrated example it is assumed that a user wanting to access the maintenance service account uses the trusted apparatus 102 to obtain access, or at least access enabling data, like credentials, as will be described in more detail below. Hence, the trusted apparatus may comprise, or even be, a mobile phone, smartphone, personal digital assistant (PDA), handset, laptop computer, and e-reading device. The apparatus 103 for the centralized signing service is an example of a centralized entity that is verifiable and authorized to provide signed tokens to a maintenance service account in the apparatus 101. It should be appreciated that the system 100 may comprise several apparatuses 101, several trusted apparatuses 102, two or more apparatuses 103 and two or more apparatuses 104. An exemplary system comprises less trusted apparatuses than apparatuses 101.

In the illustrated example, the apparatus 101 comprises an access unit 111 for enabling and allowing access to service accounts, including the maintenance service account of the apparatus, a verification unit 112 for verifying received tokens, a trust anchor unit 113 for securely maintaining and using a root certificate authority (CA) certificate, the trust anchor unit 113 corresponding in the example a certificate information unit, and one or more memories 114 storing certificate information 115, account information 116 and token information 117. The certificate information 115 may comprise different pre-installed certificates, each associated with corresponding certificate parameters required for validation of a signature or a certificate. An example of such a parameter is a public key. Another example is an expiry period of the certificate in question. Validation of a certificate is described in Internet standard (Request for comments) RFC 5280: PKIX Certificate and CRL Profile May 2008, pages 71-95, for example, which is incorporated as a reference herein. The account information 116 may comprise for the maintenance service account of the apparatus information with which users authenticate themselves, i.e. information used to determine whether a user belongs to the group of users that are allowed to access the maintenance service account, and information on rights/services provided by the maintenance service account, i.e. information on what the user is allowed to do while using the maintenance service account. The account information 116, or part of it, may be received in a token in which case it is not persistently stored. The token information 117 may comprise information obtained from a token the apparatus received for the access to the maintenance service account. For example, the token information 117 may comprise passwords or hashes of passwords used during login validation processes, and associated policies for access. In some implementations the account information may contain for the maintenance service account information how many times a token, or login information transmitted by the means of the token, can be used, and/or how long the token/login information is valid, and/or a purpose the token is granted for. The token information 117 may instead of or in addition to the account information contain all or some of the above-mentioned information. The account information 116 may instead of or in addition to the token information contain all or some of the above-mentioned information. Further, the token information and the account information may be integrated.

Depending on an implementation, the token may carry information allowing multiple use and/or validity time information and/or commands what functionality to execute or other computer instructions/commands to be executed after an access is granted and/or during the access is granted and/or some additional parameters, and the corresponding information is stored to the token information 117, when the token is received and verified. Examples of information allowing multiple use include a list of passwords in the token, a list of hashes of passwords, or information on how many times a password or corresponding information can be used. The number of times may be one, two, three, etc. Examples of commands include "fall-back to factory reset", "invalidate old configuration parameters", "update to the newest application software version after next boot" and a service maintenance script. The information carried by the token is structured information containing authorized data, i.e. data authorized by the apparatus for the centralized signing service.

In the illustrated example, the trusted apparatus 102 comprises a local authentication and authorization unit 121 for authentication and authorization of a user wanting to access a maintenance service account in the apparatus 101, a signature requesting service unit (SRS unit) 122 for the digital signature, and a local signing service (SignS) unit 127 for providing signing service for situations when an establishment of a secure communication channel to the apparatus for the centralized signing service fails. In other words, by means of the local signing service unit 127 at least part of the functionality of the apparatus 104 for the centralized signing service may be delegated to the trusted apparatus. Such a scenario may be relevant in situations where a maintenance service is required for an apparatus in an isolated location, where, for example, no suitable communication can be established between the trusted apparatus 102 and the apparatus 103 for the centralized signing service, for example if there is no air-link available. It should be appreciated that at the simplest the trusted apparatus 102 does not comprise the local signing service unit 127. The trusted apparatus comprises also one or more memories 124, which in the illustrated example comprise, for the local signing service unit 127, local information 125 for tokens, including signing certificate(s), required to generate and sign tokens and local authentication and authorization information 126 for the local authentication and authorization unit 121. For example, the local authentication and authorization information 126 may comprise information on one or more specific systems and/or specific apparatuses the maintenance service accounts of which may be accessed by this trusted apparatus, information on users allowed to try an access, information on user rights and/or login information or corresponding information of users allowed to use the trusted apparatus and/or maintenance service account(s), the login information being used for authentication.

Although not illustrated in FIG. 1, the apparatus 101 and the trusted apparatus 102 may comprise a user interface via which a user may input data or via which data may be shown to the user. A user interface may be a display and/or keyboard and/or means for reading from and/or storing to a portable memory means. Examples of portable memory means include a USB stick, a dongle, and a memory card. However, it should be appreciated that the type of the user interface bears no significance to the invention.

In the illustrated example, the apparatus 103 for the centralized signing service comprises the signing service (SignS) unit 132 for generating and signing tokens for maintenance service accounts, an authorization unit 131 for mutual authentication and authorization of the trusted device and the apparatus 103, one or more memory units 134 comprising certificate information 135, the certificate information comprising at least the same certificate information as the certificate information 115 in the apparatus 101. In the illustrated example the memory 134 further comprises local policy information 136 used for determining the additional information to be included in a token and authorization information 137 for the authorization unit 131. The local policy information contains rules and conditions under which a signed token may be obtained and/or which may be used to define for the one or more credentials included in the token one or more use conditions that also are included in the token contents. In other words, the token may contain "use information" which defines how and under which conditions credentials are usable so that an access to an account is granted only when "use information" is fulfilled. For example, the local policy information 136 may contain for tokens for a specific apparatus 101 following: for purpose "A" a one-time password valid for 10 minutes, for service account "K" a password list comprising 6 passwords, each valid 2 days and usable 3 times, except if the trusted apparatus is "L", then every second password is usable one time, a password not to be used outside Europe, or only usable for emergency case. The local policy information 135 may further define the ways how such tokens can be structured and what information they may carry. (In other words, one or more rules relating to granting access to an account are expressed by a corresponding policy, sent with the token and understood by the apparatus 101.) The authorization information 137 includes information with which a trusted apparatus and/or a user may be authenticated and authorized. Further, the authorization information 137 associates user rights/permissions to the account(s) for which the signed token(s) may be requested. In other words, the apparatus 103 for the centralized signing service is an apparatus authorized to issue specific tokens to apparatuses 101 or to systems. The apparatus 103 may be a vendor-specific centralized apparatus, and/or a regionally centralized apparatus, and/or a system-specific centralized apparatus and/or a subsystem specific centralized apparatus. For example, a company manufacturing apparatuses 101 may have one global apparatus 102 for the centralized signing service, or country-specific and/or regional-specific apparatuses 102 for the centralized signing service.

The apparatus 104 for the certificate authority entity comprises an authorization unit 141 for mutual authentication and authorization of the apparatus 103 for the centralized signing service and a root certificate authority (CA) unit 142 for issuing certificates to the apparatus 103 for the centralized signing service. It should be appreciated that the apparatus 104 for the certificate authority entity further comprises one or more memory units (not illustrated in FIG. 1) and that the apparatus 104 is a highly trusted and protected apparatus with an extremely limited access.

In the illustrated example of FIG. 1 there is a channel 11 between the apparatus 101 and the trusted apparatus 102, a channel 12 between the trusted apparatus 102 and the apparatus 103 for the centralized signing service, and a channel 13 between the apparatus 103 for the centralized signing service and the apparatus 104 for the certificate authority entity. For example, the channel 11 may comprise internal channels, a channel within the apparatus 101 and a channel within the trusted apparatus 102 when the apparatuses are geographically near enough so that the user can use user interfaces of both apparatuses. The channel 11 may be a communication channel using blue-tooth or wireless access network or any communication network or a channel using the user to physically carry an USB stick or corresponding memory means. If the channel 11 is a communication channel, it is advisable to secure the channel before any token information is transmitted over it in order to minimize a risk for a successful man-in-the-middle attack. For example, the apparatuses may perform a mutual authentication and authorization and a signed token may be encrypted by the trusted apparatus 102 or the apparatus 103 for the centralized signing service using a public key of the apparatus 101, in which case the information may be decrypted only by the apparatus 101 using its corresponding private key. However, any means to establish a secured information transfer may be used. The channel 12 is a communication channel supporting establishment of a secure connection between the trusted apparatus 102 and the apparatus for the centralized signing service 103. It may be a connection established over Internet or over a telecommunications/satellite system. The secure connection over channel 12 is preferably an authenticated and confidentially protected connection. The channel 13 may be an internal channel, if the apparatuses 103 and 104 are integrated together, or the channel may be a communication channel providing secured communication between the apparatuses 103 and 104.

Each of the apparatuses, i.e. the apparatus 101, the trusted apparatus 102, the apparatus 103 for the centralized signing service and the apparatus 104 for the certificate authority entity, is a computing device that may be any apparatus or device or equipment or network node configured to perform one or more of corresponding apparatus functionalities described herewith as an embodiment, and it may be configured to perform functionalities from different embodiments. The units referred to as an apparatus may be separate units or integrated to another unit in the same apparatus. In other embodiments, a unit in an apparatus, or part of the unit's functionality, may be located in another apparatus. The functionalities of the units are described in more detail below.

Each of the memories may be of any type (different from each other), have any possible storage structure and, if required, being managed by any database management system. It should be appreciated that the content in a corresponding memory depends on implementation details and that it bears no significance where the memory, or part of a memory, locate, i.e. they may be in another apparatus than a unit using the information stored to the memory.

It should be appreciated that each of the apparatuses may be in one physical apparatus or distributed to two or more physical apparatuses acting as one logical apparatus.

The units illustrated in FIG. 1 may be software and/or software-hardware and/or firmware components (recorded indelibly on a medium such as read-only-memory or embodied in hard-wired computer circuitry). The techniques described herein may be implemented by various means so that an apparatus implementing one or more functions of a corresponding apparatus/entity described with an embodiment comprises not only prior art means, but also means for implementing the one or more functions of a corresponding apparatus described with an embodiment and it may comprise separate means for each separate function, or means may be configured to perform two or more functions. For example, these techniques may be implemented in hardware (one or more apparatuses), firmware (one or more apparatuses), software (one or more modules), or combinations thereof. For a firmware or software, implementation can be through modules (e.g., procedures, functions, and so on) that perform the functions described herein. Software codes may be stored in any suitable, processor/computer-readable data storage medium(s) or memory unit(s) or article(s) of manufacture and executed by one or more processors/computers.

An apparatus implementing a functionality or some functionality according to an embodiment may generally include a processor (not shown in FIG. 1), controller, control unit, micro-controller, or the like connected to a memory and to various interfaces of the apparatus. Generally the processor is a central processing unit, but the processor may be an additional operation processor. Each or some or one of the units described FIG. 1 may be configured as a computer or a processor, or a microprocessor, such as a single-chip computer element, or as a chipset, including at least a memory for providing storage area used for arithmetic operation and an operation processor for executing the arithmetic operation. Each or some or one of the units described FIG. 1 may comprise one or more computer processors, application-specific integrated circuits (ASIC), digital signal processors (DSP), digital signal processing devices (DSPD), programmable logic devices (PLD), field-programmable gate arrays (FPGA), and/or other hardware components that have been programmed in such a way to carry out one or more functions of one or more embodiments. In other words, each or some or one of the units described FIG. 1 may be an element that comprises one or more arithmetic logic units, a number of special registers and control circuits.

Further, the apparatus 101, the trusted apparatus 102, the apparatus 103 for the centralized signing service and/or the apparatus 104 for the certification authority entity may comprise other units, for example, different interface units, such as a receiving unit (not illustrated in FIG. 1) for receiving different inputs, control information, requests and responses, for example, and a sending unit (not illustrated in FIG. 1) for sending different outputs, control information, responses and requests, for example. The receiving unit and the transmitting unit each provides an interface in an apparatus, the interface including a transmitter and/or a receiver or any other means for receiving and/or transmitting information, and performing necessary functions so that content, control information, etc. can be received and/or transmitted. The receiving and sending units may comprise a set of antennas, the number of which is not limited to any particular number.

The apparatus 101, the trusted apparatus 102, the apparatus 103 for the centralized signing service and/or the apparatus 104 for the certification authority entity may generally include volatile and/or non-volatile memory (not illustrated in FIG. 1), for example EEPROM, ROM, PROM, RAM, DRAM, SRAM, double floating-gate field effect transistor, firmware, programmable logic, etc. and typically store content, data, or the like. The memory may also store computer program code such as software applications (for example, for one or more of the units) or operating systems, information, data, content, or the like for the processor to perform steps associated with operation of the apparatus in accordance with embodiments. The memory, or part of it, may be, for example, random access memory, a hard drive, or other fixed data memory or storage device implemented within the processor/network node or external to the processor/network node in which case it can be communicatively coupled to the processor/network node via various means as is known in the art. An example of an external memory includes a removable memory detachably connected to the apparatus.

Figure 2:
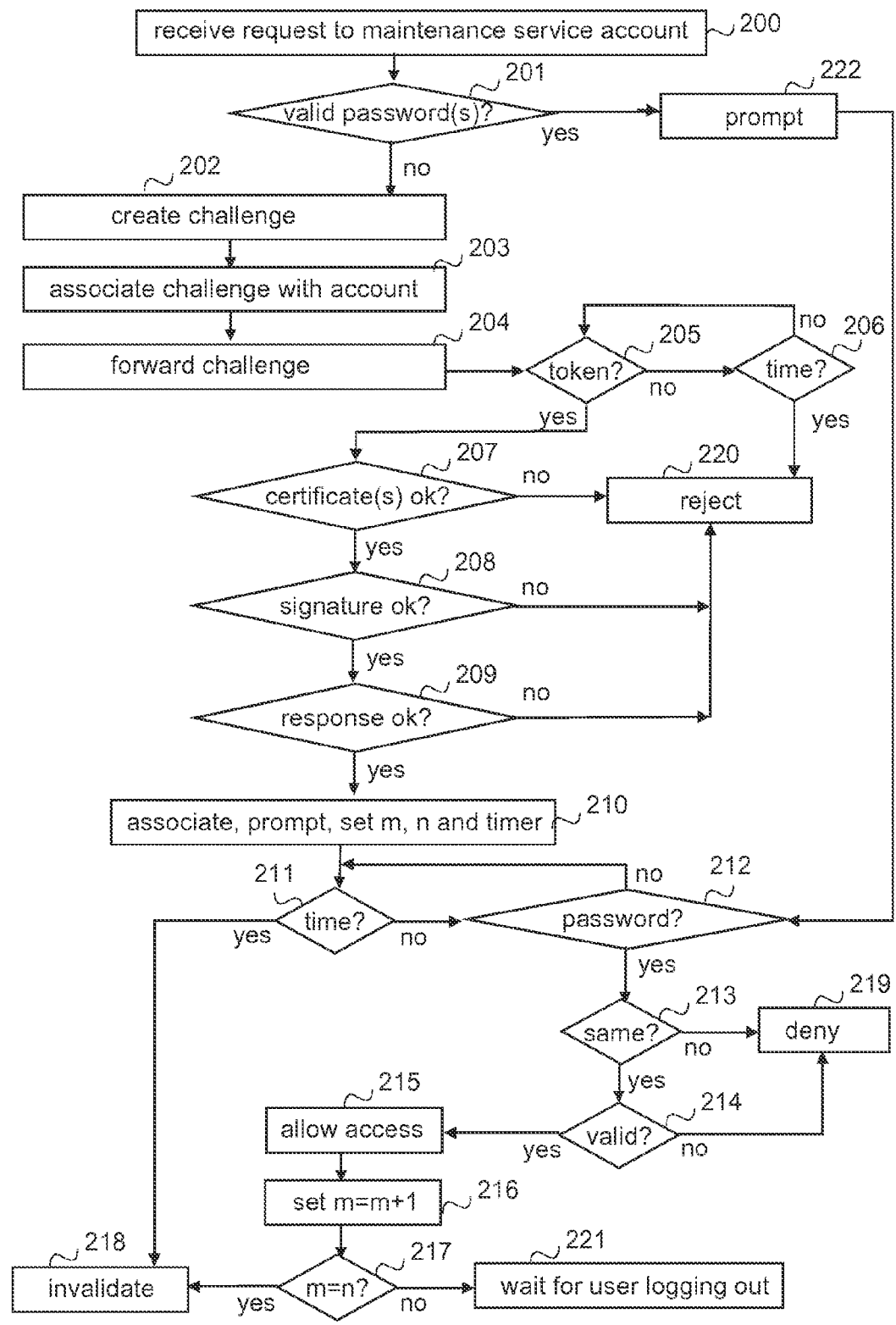
FIGS. 2 to 4 are flow charts illustrating exemplary functionalities of apparatuses.

FIG. 2 is a flow chart illustrating an exemplary functionality of the apparatus having the maintenance service account or, more precisely, functionalities of the access controlling unit, the verification unit and the trusted anchor unit. A further assumption made in the example of FIG. 2 is that the channel between the apparatus and the trusted apparatus is secured by physical presence of the user (service person) and a token is received in a portable memory. Further, it is assumed that credentials are needed and a mere password is used as the credentials.

Referring to FIG. 2, the apparatus receives in step 200 a request to a maintenance service account of the apparatus. The request may be received from a user terminal, from a trusted apparatus, or via a user interface of the apparatus. For example, the user may push a button in the apparatus or in its touch screen indicating that the user wants to change a specific part of the configuration of the apparatus. Therefore the apparatus checks, in step 201, whether or not there are one or more valid passwords for the maintenance service account. If there are no valid passwords, the apparatus creates in step 202 a challenge. For example, the apparatus may comprise a true random number generator that generates a random number to be used as a challenge, or the apparatus may contain a list of unique numbers or strings of characters wherefrom a number (or a string) is obtained to be the challenge, and preferably thereafter deleted to ensure that it is used by this apparatus only once as a challenge. Any other means to create a challenge may be used and it should be appreciated that the way how the challenge is created is irrelevant for the invention. Then the apparatus associates in step 203 the challenge with the maintenance service account and/or for the intended purpose (i.e. the reason for which the access request was made) and hence triggers monitoring that a response for this challenge for this specific account/purpose is waited for a predetermined time. The apparatus performs the associating by storing temporarily the information, for example. Further, the apparatus forwards in step 204 the challenge. In this example, the forwarding may be performed by showing the challenge to the user or by storing the challenge to an USB stick and prompting the user to move the stick. If a connection exists between the apparatus and the trusted apparatus, the challenge may be sent over the connection, even over an unsecured connection.

As said above, in this example, the apparatus starts to wait for a token (step 205) for this specific request for the predetermined time (step 206). An advantage of this time monitoring is to ensure that the apparatus stops at some point for waiting if no response is received. If the token is received (step 205) before the predetermined time has elapsed (step 206), the apparatus validates the signed token by performing the following three checks: steps 207, 208 and 209. In the example it is assumed that the token comprises, in addition to the access enabling data, one or more certificates, a response to the challenge, and as a signature an encrypted hash. In the example, the one or more certificates are for validating the token. In another example the token does not contain the certificates but pre-installed certificates are used. A further example combines the idea of having certificates transmitted with the token and pre-installed certificates. In the illustrated example the apparatus first checks in step 207, using the certificate information in the memory, whether or not all certificates included in the token are valid (ok). In other words, the certificates are mapped against the certificate information relating to the apparatus for the centralized signing service and the root CA certificate that are maintained in the memory. In other words, it is checked, if the certificate(s) correspond(s) to the stored validation information comprising validity periods, for example. If all certificates are valid, then it is checked in step 208 whether or not the signature is valid (ok). This is performed by calculating a hash value from the actual contents of the token, i.e. the token content without the signature (encrypted hash), decrypting the signature using the public key of the apparatus for the centralized signing service determined by the means of the certificate(s), and comparing the calculated hash value with the decrypted signature. If they are the same, and since the certificate(s) are valid (step 207), the token is actually signed by the apparatus for the centralized signing service and the signature is valid. If the signature is valid, it is checked, in step 209, whether or not the response to the challenge is the one the apparatus is waiting for. If it is, the apparatus enables access to the maintenance service in step 210. In the example it is assumed that the token contained one certificate, a password usable for a specific amount of times and valid for a certain time period. Therefore in the example the enablement step 210 comprises associating the received password with the maintenance service account, setting a variable "m" indicating the number of times the password has been inputted by the user to zero and a variable "n" indicating the amount a password can be used to the value the token indicates and a timer for the password to correspond the validity time indicated in the token, and prompting the user to provide a password. The user obtains the password via the trusted apparatus, as will be described below. It should be appreciated that the enablement step may comprise other functions, and it depends on the contents of the token and/or local configuration. For example, if a list with one-time-usable passwords is provided with no time limit, the enablement step comprises storing the list and possibly prompting the user to provide a password.

Then, in the illustrated example, the apparatus starts to monitor whether the time has elapsed (step 211) or a password is received (step 212). If a password is received, it is checked in step 213, whether or not the password inputted by the user and the password received in the token are the same. If the received password is the same as the password in the token, it is checked, in step 214, whether or not the password is still valid. If it is, access to the maintenance service account is allowed in step 215, and m is updated in step 216 to be m+1. Then it is checked in step 217, whether or not the updated value of m is equal to n. If it is, the password is invalidated in step 218.

If the validity time has elapsed (step 211), the password is invalidated in step 218. An advantage provided by monitoring this validity period is that if a password (or a password list) is stolen, the man-in-the-middle cannot use the information a very long time. And since the password is only for this apparatus, it is not usable in other apparatuses.

If the password is not any more valid (step 214) or the password is not the same (step 213), the access is denied in step 219. When the access is denied because the password is not the same, all still valid passwords may be invalidated, or they may be invalidated after a predetermined amount of unsuccessful trials.

If the token is not received in time (step 206), the request is rejected in step 220. The request is also rejected if the signed token is not verified, i.e. one of the checks performed in steps 207 (certificate validation), 208 (signature validation) and 209 (response to challenge fails).

If the updated value of m is not equal to n (step 217), the process waits in step 221 that the user logs out. Meanwhile maintenance service may be carried out (not illustrated in the FIG. 2).

If there are still valid passwords (step 201) when the request to access the service account is received, the user is prompted in step 222 to input a password and the process then continues to step 212 to monitor whether or not a password is received within the validity time.

In another example, in which a list of one-time passwords is received, it is checked, in step 213 whether or not the password is in the list, and then the validity check comprises checking whether or not the password has been used earlier. If the password is valid and used for the first time, the access is allowed and the password is marked as used or deleted from the list. In another example, If a list of n times usable passwords is received, a password is marked as used or deleted from the list, when "m" obtains value of n (step 217).

As can be seen from FIG. 2, the apparatus does not need to use in the examples its own private key so that by reverse-engineering alone no access to a maintenance service account will be enabled.

Figure 3:
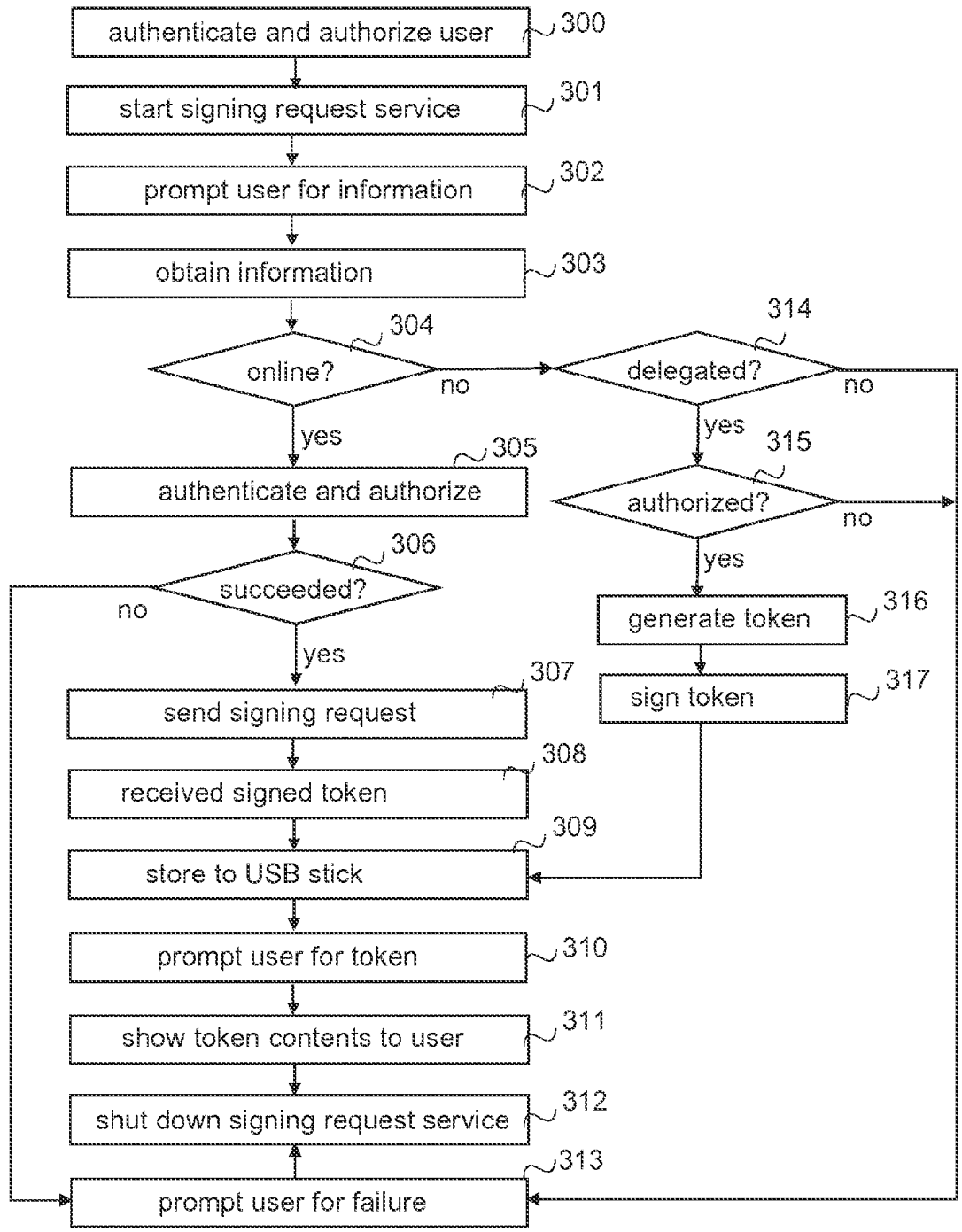

FIG. 3 illustrates functionality of the trusted apparatus, or more precisely, the functionality of the signing request service unit and the local signing service unit. In the example illustrated in FIG. 3 it is assumed that the user (service person) wanting to have access to the maintenance service account uses a removable USB memory, like a memory stick, to convey information between the trusted apparatus and the apparatus having the maintenance service account. Further, it has been assumed that the trusted apparatus supports the local signing service. In other words, at least part of the functionality provided by the apparatus for the centralized signing service is delegated to the trusted apparatus for use if needed.

FIG. 3 starts when the user (service person) is authenticated and authorized in step 300 for a service account in the trusted apparatus, the service account allowing the use of a signing request service and use of received tokens. Depending on an implementation, the service account may be a user-specific service account or a "group-specific" service account.

The trusted apparatus starts, in step 301, the signing requesting service in response to a user instruction. Then the trusted apparatus prompts, in step 302, the user to input at least the challenge (i.e. at least the minimum information provided by the apparatus having the maintenance service account). In this specific example, the user inserts the USB stick to the trusted apparatus, which obtains, in step 303, the challenge and other possible information stored to the USB stick by the apparatus having the maintenance service account. Then the trusted apparatus checks, in step 304, whether or not it has or succeeds in establishment of a secured online connection to the apparatus for the centralized signing service. The establishment includes authenticating the trusted apparatus to the apparatus providing the signing service so that the secured online connection is an authenticated and confidentially protected connection. Different ways of establishing such a secured online connection are well known by one skilled in the art, and the way how the secured online connection is established bears no significance to the invention. Therefore it is not described in detail here.

In the illustrated example, if there is a secured online connection or an online connection, the trusted apparatus authenticates and authorizes, in step 305, the user and/or the trusted apparatus with the apparatus for the centralized signing service. This authentication and authorization may be performed while the secured online connection is established, or the online connection is transferred to be a secured online connection. The information needed for user authentication and authorization is the same as the one used when the user was authenticated and authorized to the trusted apparatus. If the authentication and authorization succeed (step 306), the trusted apparatus sends in step 307 a signing request with the challenge. The signing request may further comprise additional parameters, like information relating to the trusted apparatus and/or the user, or some system identifier assigned to the apparatus having the maintenance service account, or authorization parameters describing the reason for the access request, or the number of times the access should be granted, the information being obtained with the challenge, for example. Since the connection is a secured one, the signing request, as well as the response to it, is protected against modifications and man-in-the-middle attacks. When the trusted apparatus receives in step 308 a signed token as a response to the signing request, it stores in step 309 the signed token to the USB stick, prompts in step 310 the user that the USB stick now contains the signed token, and shows in step 311 or otherwise outputs, the token content with or without the signature to the user so that the user receives the information needed to access the maintenance service account. Then the trusted apparatus shuts in step 312 down the signing request service for this request.

If the authentication or the authorization fails (step 306), i.e. at least one of the one or more entities to be authenticated and authorized is not authenticated or authorized, the trusted apparatus prompts in step 313 the user about the failure, the prompt indicating that the user will not obtain a token for the maintenance service account access. Then the signing request service for this request is shut down in step 312.

If there is no secured online connection (step 304), the trusted apparatus checks in step 314 whether or not it has been delegated signing service functionality for this specific maintenance service account and/or the apparatus having the maintenance service account. If yes, the trusted apparatus checks in step 315, by using the local authentication and authorization information, whether or not the user is authorized to receive access to the maintenance service account. If yes, the trusted apparatus generates in step 316 the token (which may be called a local token) and signs it in step 317 using a local signing key which is a specific key that has been generated beforehand and certified, as will be explained with FIG. 6. Then the process proceeds to step 309 where the signed token is stored to the USB stick.

Figure 4:
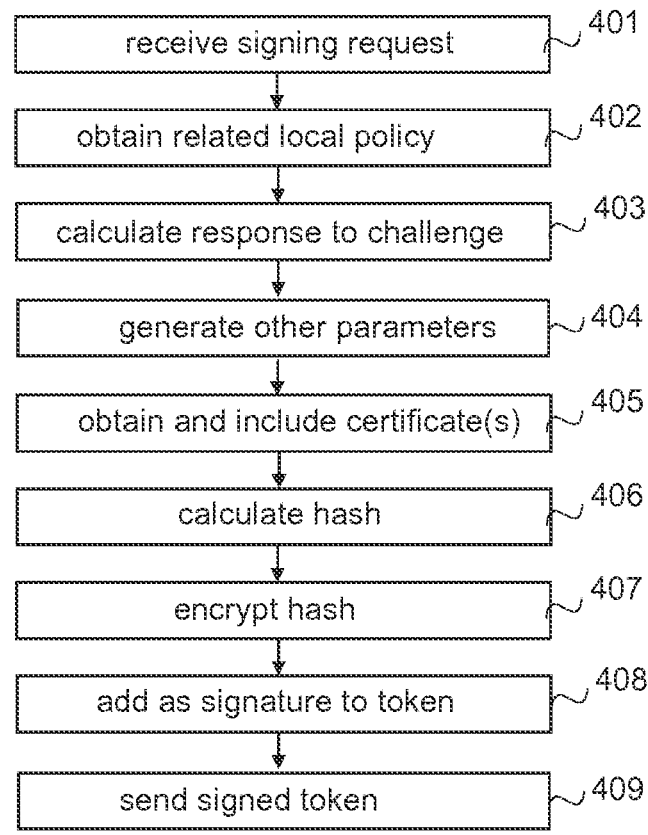

FIG. 4 illustrates functionality of the apparatus for the centralized signing service, or more precisely, the functionality of the signing service unit after a successful authentication and authorization of the trusted apparatus and/or the user. The successful authentication and authorization is used for determining that the trusted apparatus and/or the user is permitted to receive a permission for the requested maintenance service and therefore the steps illustrated are performed. It should be appreciated that in some other example the trusted apparatus and/or the user may be authenticated and/or authorized after a signing request is received. However, in this example the order is different.

Referring to FIG. 4, a signing request containing at least a challenge and a system identifier is received in step 401. The signing request may contain other information, like information relating to the trusted apparatus or to the authenticated user, as explained above. In response to the request containing the system identifier or corresponding information with which the system of the apparatus having the maintenance service account, or the apparatus itself, and/or the requested maintenance service may be identified accurately enough, a relating local policy is obtained in step 402. Then a response to the challenge is calculated in step 403. The calculation of the response is known by one skilled in the art and therefore there is no need to describe it in more detail here. Using the obtained local policy, other parameters for the token are generated in step 404. Examples of other parameters include a password, password list, validity time of the password or the password list, the number of times a password may be used (if a password list is generated, each password in the list may have its own validity time or the number of times), instruction to invalidate all valid passwords after a predetermined amount of unsuccessful trials, the amount of allowable unsuccessful trials, commands, scripts, etc. It should be appreciated that steps 402 and 404 may be combined in implementations in which the local policy is executed instead of obtaining. Further, in step 405, one or more certificates are obtained for the token from the apparatus for the certificate authority entity, and a hash is calculated in step 406 from information containing the response to the challenge, the other parameters and the one or more certificates. In other words, the hash is calculated from the actual contents of the token, and thereby the token is signed. Then the hash is decrypted in step 407 using a private key of the apparatus. The private key is a counter-part of the public key in the certificate info (the certificate associated with the public key is public and used for validating the signature, as is explained above with FIG. 2). Then the encrypted hash is added in step 408 as a signature to the token that already comprises the information (the actual contents), and the result is a signed token. The signed token is sent in step 409 to the trusted apparatus over the secure online communication channel. It should be appreciated that depending on an implementation a certificate may be signed (i.e. taken into account when the hash from the actual contents is calculated) or merely added to the signed token.

Figure 5:
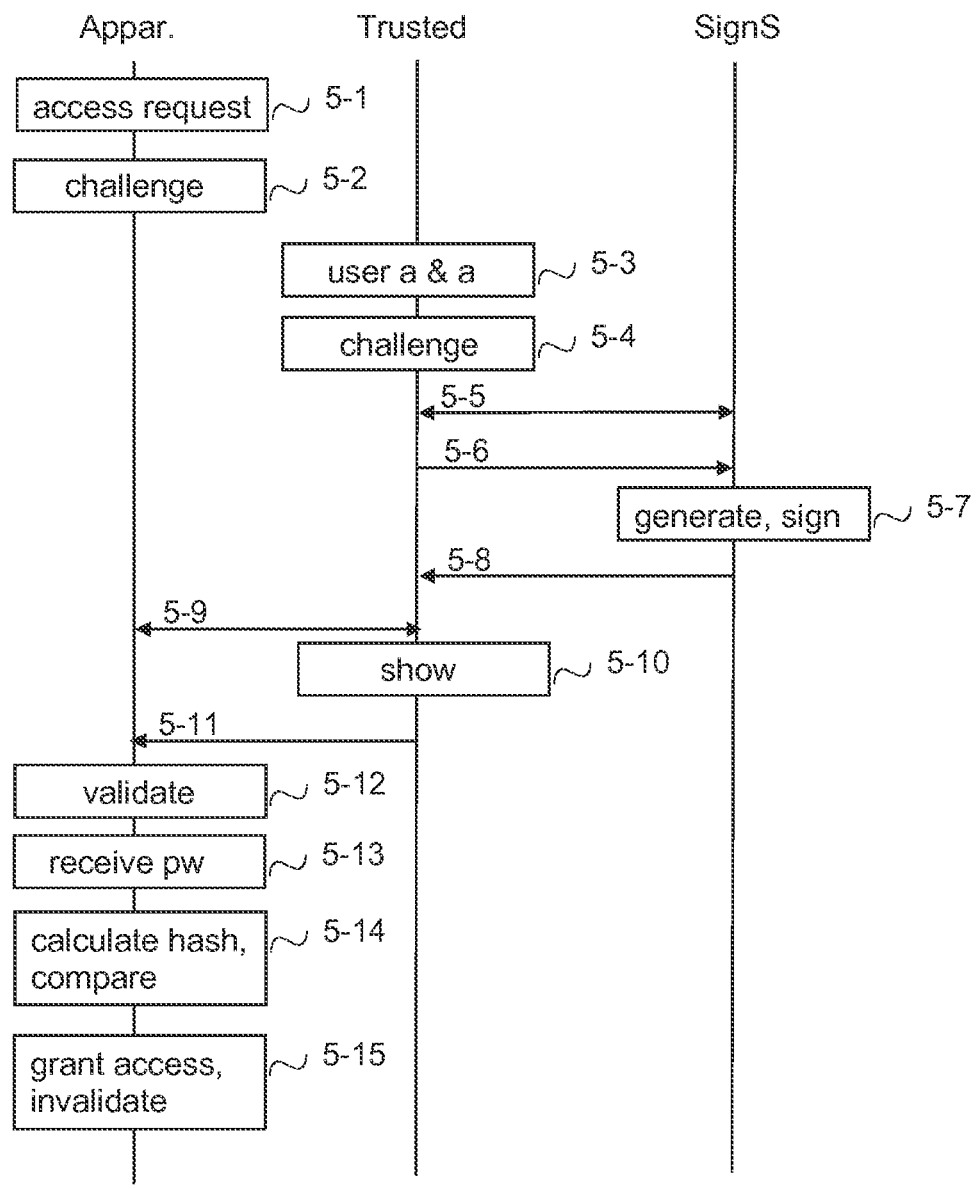

FIG. 5 is a chart illustrating information exchange according to an example. In the example it is assumed that authentications and authorizations will succeed and the password used as credentials is a valid one.

FIG. 5 starts in a situation in which an apparatus (Appar.) detects in point 5-1 an access request to access a service account in the apparatus. The apparatus responds in point 5-2 by creating and showing a challenge in a user interface of the apparatus to the user, and storing the challenge in association with the service account.

In this example, before inputting the challenge and related information to the trusted apparatus, the user and the trusted apparatus perform in point 5-3 a mutual authentication and authorization. In response to receiving the challenge and the related information in point 5-4, the trusted apparatus and an apparatus for the centralized signing service (SignS) performs a mutual authentication in messages 5-5 to establish a secure connection, as described above. A signing request 5-6 containing at least the challenge and possible other information is then sent from the trusted apparatus to the apparatus for the centralized signing service. The apparatus for the centralized signing service generates in point 5-7 the token information and signs it in point 5-7 as described above, and the signed token allowing n time access (n being one or more) is sent to the trusted apparatus in a response 5-8. In this specific example it is assumed that the token information contains two separate pieces: a first piece intended to the trusted apparatus, or more precisely to the user, and a second piece, the actual signed token. In the example, the first piece includes a password, and possible further information, like that the password is usable only once and/or its validity period. The second piece comprises a hash of the password, a certificate, and a signature calculated from the actual contents formed in this example by the hash, information indicating the validity time of the password and that the password is usable only once. In the example the second piece is encrypted using the public key of the apparatus, the public key being known by the apparatus for the centralized signing service.

When the trusted apparatus receives the response 5-8, it is configured, in this example, to establish a connection to the apparatus. Therefore the apparatus and the trusted apparatus perform a mutual authentication and authorization by messages 5-9. This information exchange may include changing information on public keys, although the public key of the apparatus may be known by the trusted apparatus beforehand (and/or vice versa). The trusted apparatus also shows in point 5-10 to the user the first piece received in the response 5-8. Further, the trusted apparatus forwards the second piece in 5-11 to the apparatus over the established channel between them.

The apparatus decrypts the token and validates it in point 5-12. Then the apparatus receives in point 5-13 a password from the user, calculates a hash from the password and compares the calculated hash with the received hash in point 5-14. Since in the example they match, the apparatus grants in point 5-15 access to the account, and, since the token in this example is for one-time-access, invalidates the hash so that a new trial will not succeed.

Hence, advantages of a token conveying one password usable only once is that there is no need to store the password for a long time, and if the trusted apparatus is stolen or known as "being compromised", deauthorizing the trusted apparatus centrally will suffice so that no further tokens to the apparatus (or other apparatuses having maintenance service accounts) are obtained. Naturally, if the deauthorized apparatus is configured to provide local signing service it will not obtain signing certificates and related information which are needed for the local signing service.

Figure 6:
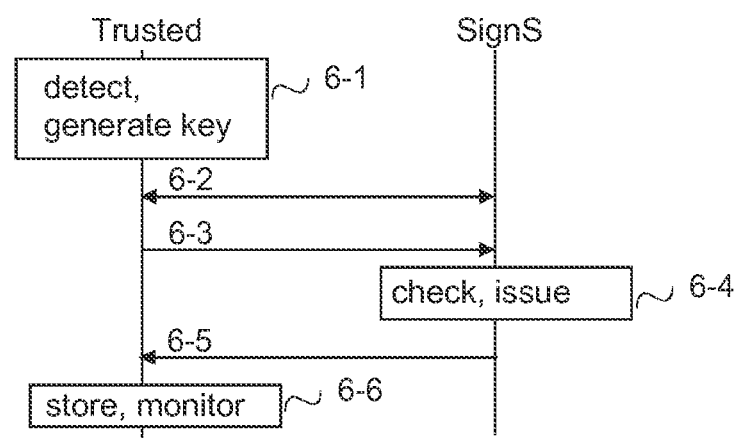
FIGS. 5 and 6 are charts illustrating exemplary information exchange.

FIG. 6 is a chart illustrating information exchange according to an example in which at least part of the signing service may be delegated to the trusted apparatus. In the example it is assumed that authentications and authorizations will succeed.

Referring to FIG. 6, the trusted apparatus (Trusted) detects in point 6-1 that its local information for tokens for an apparatus having a maintenance service account is not any more valid. Therefore the trusted apparatus generates a signing key in point 6-1 and triggers a mutual authentication and authorization (messages 6-2) with the apparatus for the centralized signing service (SignS). The signing key is a short time private/shared key for signing, and in the authentication/authorization another private key, or if shared secrets are used another shared key, is used. After that the trusted apparatus sends a request 6-3 for information to sign tokens. In other words, it requests for short time signing certificates. The request may specify one or more apparatuses and/or purposes for which the information is requested. Further, the request contains a proof-of-possession for the generated signing key. It should be appreciated that also other means than the proof-of-possession may be used to check the signing key before any signing certificates are issued.

In response to the request 6-3, the apparatus for the centralized signing service checks the proof-of-possession of the generated signing key and whether it has delegated the signing service for that trusted apparatus (and for the indicated purpose and/or apparatus). The proof-of-possession has to be checked, because the public key within the certificate must match to the private key (i.e. to the generated signing key). Since in the illustrated example both checks are passed, the apparatus for the centralized signing service generates in point 6-4 the local information for signing tokens. In other words, it issues short time signing certificates. The apparatus for the centralized signing service may add to the local information a validity period, typically a short one, and/or some use restrictions. Then the information (short time signing certificates) is sent to the trusted apparatus in message 6-5.

In response to receiving the information, the trusted apparatus stores, in step 6-6, the received information and monitors its validity. In other words, the trusted apparatus receives a signing certificate from the centralized signing service, the signing certificate enabling the trusted apparatus to use the signing key for generating valid signatures.

One can say that a signing certificate with restricted validity period with the local policy information and local authorization information establishes the delegation of the centralized signing service. By validation of the certificate validation path the apparatus where the maintenance service account is located may check whether or not the trusted apparatus has a valid "delegated" signing certificate.

The above examples provide individual n-time access tokens authorized by a central entity. Hence the many-to-many relationship between the authorized user group members and apparatuses having such maintenance service accounts can be mapped to point-to-point relationships. Thanks to this, general passwords that are shared by several persons are avoided, thereby avoiding problems relating to the general passwords or password lists, including logistics problems (how to deliver the passwords to several users) and misuse problems (how to make sure that someone not any more belonging to the authorized user group do not anymore know the password or password list but the ones still belonging are granted access). A further observation is that the above described examples provide a flexible and adaptive mechanism that may take into account specific needs or restrictions ever user-apparatus-specifically.

The steps, information exchange messages and related functions described above in FIGS. 2-6 are in no absolute chronological order, and some of the steps/information exchange may be performed simultaneously or in an order differing from the given one. For example, step 405 may be performed after step 408, i.e. the certificate may be added after the other content is signed, or simultaneously with the signing of the other content. Other functions can also be executed between the steps/related functions or within the steps/related functions. For example, in FIG. 2, after the user has been prompted to provide a password, it may be monitored whether or not the password is received within a predetermined time. Some of the steps/information exchange or part of the steps/information exchange can also be left out or replaced by a corresponding step/information exchange or part of the step/information exchange. For example, using the USB stick may be replaced by using Bluetooth, etc. Another example includes leaving steps 314-315 and directly prompting the user about failure, if online connection establishment from the trusted apparatus to the apparatus for the centralized signing service fails. Still another example is to skip calculating a hash from a received password if passwords instead of hashes are delivered to the apparatus having the account. The messages (requests, responses, etc.) are only exemplary and may even comprise several separate messages for transmitting the same information. For example, the proof-of-possession may be sent in another message than the request for signing certificates, and the messages and associated points may use different protocols. In addition, the messages may also contain other information.

Although in the above it is assumed that the local policy is used to determine certain features relating to the token or the signing certificates, it should be appreciated that instead of the local policy, the tokens or the signing certificates signed by the apparatus for the centralized signing service may all be generated using the same rules, conditions and/or definitions, or the rules, conditions and/or definitions may be received from the trusted apparatus or via the trusted apparatus as part of the signing request.

Although in the above the examples are illustrated assuming that the token contains the certificate(s) and additional information, if any, it should be appreciated that the examples are implementable with a solution in which the certificate(s) are delivered beforehand, delivered with the token, and/or the additional information is delivered with the token and/or the token contains hash of a password, or a list of such hashes. If the apparatus receives password hashes, passwords may be forwarded to the trusted apparatus with the token in which case the trusted apparatus is configured not to forward the passwords to the apparatus but to output the one or more passwords to the user. The user may receive the passwords corresponding to the hashes via any other trustworthy mechanism.

Although in the above the examples are illustrated with the maintenance service accounts, it should be appreciated that the same mechanism can be used with administrator accounts as well, and with user accounts if an enhanced security is needed.

It will be obvious to a person skilled in the art that, as technology advances, the inventive concept can be implemented in various ways. The invention and its embodiments are not limited to the examples described above but may vary within the scope of the claims.

The invention claimed is:

1. A method comprising:
receiving, in an apparatus of an individual system, an access request to a maintenance service account in the apparatus;
creating, in response to the access request, a challenge;
forwarding the challenge;
receiving a signed token relating to the challenge;
checking whether or not the token is signed by a centralized entity that is verifiable by the apparatus and authorized to provide signing services for the account;
if the token is signed by the centralized entity, checking whether a first response in the token corresponds to a response the apparatus expects to receive for the challenge; and
if yes, checking whether access enabling data indicates that a further input from a user is required or the token is an access token itself;
if the token is an access token itself, granting the user access to the account, and granting the user permission with respect to dedicated maintenance service tasks of the individual system;
if the further input is required:
prompting the user for credentials;
receiving credentials via a user interface, wherein one or more of the received credentials comprise one or more use conditions;
considering the one or more of the received credentials as valid if all use conditions relating of the one or more of the received credentials are fulfilled;
checking whether the received credentials correspond to valid credentials in the access enabling data; and
granting the user access to the account, and granting the user permission with respect to dedicated maintenance service tasks of the individual system, if the credentials received via the user interface correspond to valid credentials in the access enabling data.

2. A method as claimed in claim 1, further comprising:
maintaining certificate information in the apparatus;
receiving in the token one or more certificates;
checking, prior to checking whether the access enabling data indicates that a further input from a user is required or the token is an access token itself, a validity of the received one or more certificates using the certificate information; and
checking whether the access enabling data indicates that a further input from a user is required or the token is an access token itself if the one or more certificates are valid, the token is signed by the centralized entity and the first response corresponds to the response the apparatus is waiting for.

3. A method as claimed in claim 1, further comprising:
monitoring the fulfillment of the one or more use conditions.

4. A method as claimed in claim 3, wherein
the one or more credentials comprises a password, a list of passwords, a hash of a password, or hashes of passwords, and
the one or more use conditions defines at least one of a common or credential-specific validity time for the one or more credentials, and a common or credential-specific use-time-value indicating how many times the one or more credentials can be used to obtain access to the account.

5. A method as claimed in claim 3, further comprising:
checking, in response to the access request and prior to creating the challenge, whether there are any valid credentials for the account;
if there are, prompting a user to input a credentials instead of creating the challenge.

6. A method as claimed in claim 1, further comprising:
determining whether or not the account provides rights to change maintenance related information or other configuration parameters of the apparatus; and
creating the challenge only in response to the account providing the rights to change the maintenance related information or other configuration parameters of the apparatus.

7. A method comprising:
authenticating and authorizing by a first apparatus a user for an account allowing access to a signing service request service;
receiving a challenge;
authenticating and authorizing the first apparatus with a centralized entity providing signing services;
establishing a secured communication channel between the first apparatus and the centralized entity;
forming a signing request including at least the challenge;
sending the signing request to the centralized entity over the channel;
receiving in the first apparatus a signed token from the centralized entity, the signed token comprising at least access enabling data for another account in a second apparatus, wherein the access enabling data is associated with allowance for a requested maintenance for an individual system; and forwarding the signed token to the second apparatus, wherein the access enabling data comprises one or more credentials with one or more use conditions for the credentials, wherein the one or more credentials are valid if all use conditions relating to the one or more credentials are fulfilled, and wherein the user is granted access to the account in the second apparatus and permission with respect to dedicated maintenance service tasks of the individual system, if the one or more credentials received correspond to valid credentials in the access enabling data.

8. A method as claimed in claim 7, further comprising:
outputting at least part of the access enabling data to the user.

9. A method as claimed in claim 7, the method further comprising:
providing local signing service;
requesting temporary certificates for the local signing service from the centralized entity;
receiving the temporary certificates;
monitoring validity of the temporary certificates;
forming, in response to detecting that establishment of the channel fails, a local token using the temporary certificates;
signing the local token;
forwarding the signed local token as the local token to the second apparatus.

10. A method as claimed in claim 9, further comprising:
providing the local signing service only to a predefined group of accounts and/or second apparatuses;
receiving, with the challenge, information on the predefined group of accounts and/or the second apparatuses;
checking, in response to detecting that establishment of the channel fails and before forming the local token, whether or not the account and/or the second apparatus belongs to the predefined group of accounts and/or second apparatuses; and
forming the local token if the account and/or the second apparatus belongs to the predefined group of accounts and/or second apparatuses.

11. A method comprising:
providing a centralized entity for signing services;
authenticating and authorizing a user, by the centralized entity, a first apparatus;
establishing a secure communication channel between the first apparatus and the centralized entity;
receiving in the centralized entity from the first apparatus a signing request containing a challenge, the signing request indicating that it is for obtaining access enabling data to an account in a second apparatus;
generating by the centralized entity access enabling data;
calculating by the centralized entity a response to the challenge;
forming by the centralized entity a token comprising at least the access enabling data and the challenge;
signing by the centralized entity the token; and
sending the signed token over the secure communication channel to the first apparatus,
wherein the access enabling data is associated with allowance for a requested maintenance for an individual system,
wherein the access enabling data comprises one or more credentials with one or more use conditions for the credentials,
wherein the one or more credentials are valid if all use conditions relating to the one or more credentials are fulfilled, and
wherein the user is granted access to the account in the second apparatus and permission with respect to dedicated maintenance service tasks of the individual system, if the one or more credentials received correspond to valid credentials in the access enabling data.

12. A method as claimed in claim 11, further comprising:
obtaining local policy relating to the second apparatus and/or the account;
generating one or more use conditions according to the local policy, the one or more use conditions comprising at least one of validity period of the access enabling data and information on how many times the access enabling data or a piece of the access enabling data can be used to obtain access to the account in the second apparatus;
adding to the token the one or more use conditions before the token is signed.

13. A method as claimed in claim 12, wherein the access enabling data comprises one or more credentials, and the one or more use conditions defines a validity time for the one or more credentials and/or a use-time-value indicating how many times the one or more credentials can be used to obtain access to the account, the validity time and/or the use-time-value being common or credential-specific.

14. A method as claimed in claim 11, further comprising:
adding certificate information shared with the second apparatus to the token.

15. A method as claimed in claim 11, further comprising:
receiving in the centralized signing entity from the first apparatus a request for one or more temporary certificates by means of which the first apparatus may form and sign a token comprising the access enabling data to the account in the second apparatus; and
issuing one or more temporary certificates to the first apparatus.

16. A method as claimed in claim 15, further comprising:
maintaining in the centralized signing entity information indicating allowed apparatuses to which the centralized signing entity is allowed to issue temporary certificates; and
issuing the one or more temporary certificate, if the first apparatus belongs to the allowed apparatuses.

17. A computer program product, embodied on a non-transitory computer readable medium, comprising program instructions, that when run is adapted to perform at least the steps of:
receiving, in an apparatus of an individual system, an access request to a maintenance service account in the apparatus:
creating, in response to the access request, a challenge;
forwarding the challenge;
receiving a signed token relating to the challenge;
checking whether or not the token is signed by a centralized entity that is verifiable by the apparatus and authorized to provide signing services for the account;
if the token is signed by the centralized entity, checking whether a first response in the token corresponds to a response the apparatus expects to receive for the challenge; and
if yes, checking whether access enabling data indicates that a further input from a user is required or the token is an access token itself;

if the token is an access token itself, granting the user access to the account, and granting the user permission with respect to dedicated maintenance service tasks of the individual system;
if the further input is required:
prompting the user for credentials;
receiving credentials via a user interface, wherein one or more of the received credentials comprise one or more use conditions;
considering the one or more of the received credentials as valid if all use conditions relating of the one or more of the received credentials are fulfilled;
checking whether the received credentials correspond to valid credentials in the access enabling data; and
granting the user access to the account, and granting the user permission with respect to dedicated maintenance service tasks of the individual system, if the credentials received via the user interface correspond to valid credentials in the access enabling data.

18. An apparatus comprising:
at least one processor; and
at least one memory including computer program code,
the at least one memory and computer program code configured to, with the at least one processor, cause the apparatus at least to:
receive, in an apparatus of an individual system, an access request to a maintenance service account in the apparatus;
create, in response to the access request, a challenge;
forward the challenge;
receive a signed token relating to the challenge;
check whether or not the token is signed by a centralized entity that is verifiable by the apparatus and authorized to provide signing services for the account;
if the token is signed by the centralized entity, check whether a first response in the token corresponds to a response the apparatus expects to receive for the challenge; and
if yes, check whether access enabling data indicates that a further input from a user is required or the token is an access token itself;
if the token is an access token itself, grant the user access to the account, and granting the user permission with respect to dedicated maintenance service tasks of the individual system;
if the further input is required:
prompt the user for credentials;
receive credentials via a user interface, wherein one or more of the received credentials comprise one or more use conditions;
consider the one or more of the received credentials as valid if all use conditions relating of the one or more of the received credentials are fulfilled;
check whether the received credentials correspond to valid credentials in the access enabling data; and
grant the user access to the account, and granting the user permission with respect to dedicated maintenance service tasks of the individual system, if the credentials received via the user interface correspond to valid credentials in the access enabling data.

19. A system, comprising:
a first apparatus, including a first processor;
a first memory, including first computer code, the at least one memory and first computer code configured to, with the at least one processor, cause the first apparatus to receive an access request to an account in the first apparatus;
create, in response to the access request, a challenge;
forward the challenge;
receive a signed token relating to the challenge;
check whether or not the token is signed by a centralized entity that is verifiable by the apparatus and authorized to provide signing services for the account;
if the token is signed by the centralized entity, check whether a first response in the token corresponds to a response the apparatus expects to receive for the challenge; and
if yes, check whether the access enabling data indicates that a further input from a user is required or the token is an access token itself;
if the token is an access token itself, grant the access;
if the further input is required:
prompt the user for credentials;
receive credentials via a user interface;
check whether the received credentials correspond to credentials in the access enabling data;
if yes, granting the access to the account; said system further comprising a second apparatus, said second apparatus including:
a second processor;
a second memory including second computer program code, said second memory and second computer program code configured to with the second processor, cause the second apparatus to authenticate and authorize by the first apparatus a user for an account allowing access to a signing service request service;
receive a challenge;
authenticate and authorize the first apparatus with a centralized entity providing signing services;
establish a secured communication channel between the first apparatus and the centralized entity;
form a signing request including at least the challenge;
send the signing request to the centralized entity over the channel;
receive in the first apparatus a signed token from the centralized entity, the signed token comprising at least access enabling data for another account in a second apparatus; and
forward the signed token to the second apparatus, said system further comprising:
a third apparatus, said third apparatus including a third processor;
a third memory including third computer program code, said third memory and third computer program code configured to, with the third processor, cause the third apparatus to
provide a centralized entity for signing services;
authenticate and authorize, by the centralized entity, the first apparatus;
establish a secure communication channel between the first apparatus and the centralized entity;
receive in the centralized entity from the first apparatus a signing request containing a challenge, the signing request indicating that it is for obtaining access enabling data to an account in the second apparatus;
generate by the centralized entity access enabling data;
calculate by the centralized entity a response to the challenge;
form by the centralized entity a token comprising at least the access enabling data and the challenge;
sign by the centralized entity the token; and
send the signed token over the secure communication channel to the first apparatus, said system further comprising a fourth apparatus, said fourth apparatus including a root certificate issuance service, the fourth apparatus being configured to provide the third apparatus with information needed for signing tokens;

wherein the second apparatus is connectable at least to the third apparatus, the third apparatus is connectable to the second apparatus and to the fourth apparatus, and the first apparatus is not directly connectable to the third and fourth apparatus.

20. A system as claimed in claim 19, wherein information exchange between the first apparatus and the second apparatus is over a network connection and/or over a Bluetooth connection and/or utilizes user interfaces in the first and the second apparatus and/or the user interfaces and portable memory means.

21. A system as claimed in claim 19, wherein the signed token provides n times access to the account, wherein n is an integer whose value is one or more.

\* \* \* \* \*